Sept. 7, 1926.  
F. GELSTHARP  
APPARATUS FOR MAKING SHEET GLASS  
Filed May 7, 1923  
1,598,770  
2 Sheets-Sheet 1
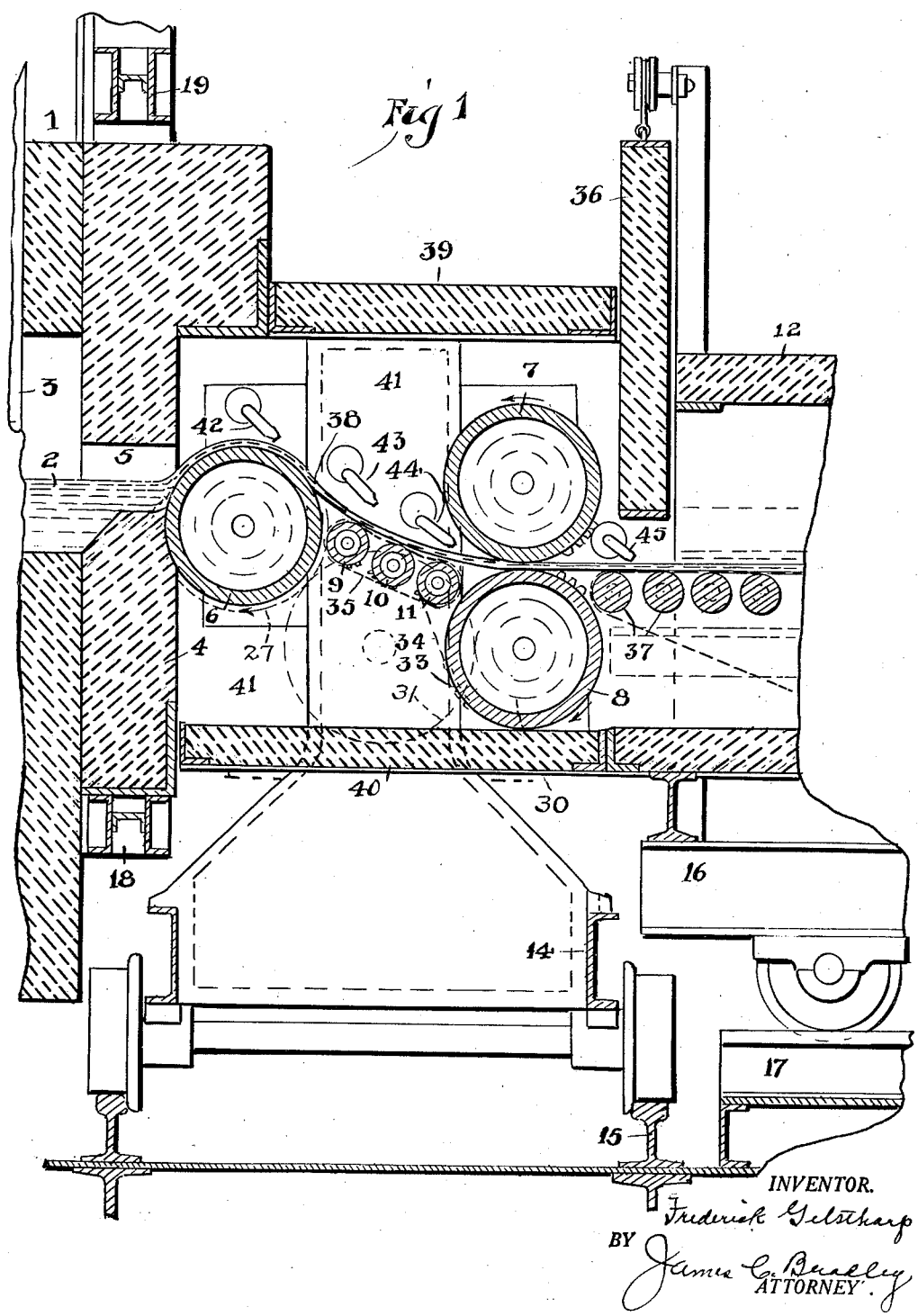

Sept. 7, 1926.  
F. GELSTHARP  
1,598,770  
APPARATUS FOR MAKING SHEET GLASS  
Filed May 7, 1923  
2 Sheets-Sheet 2
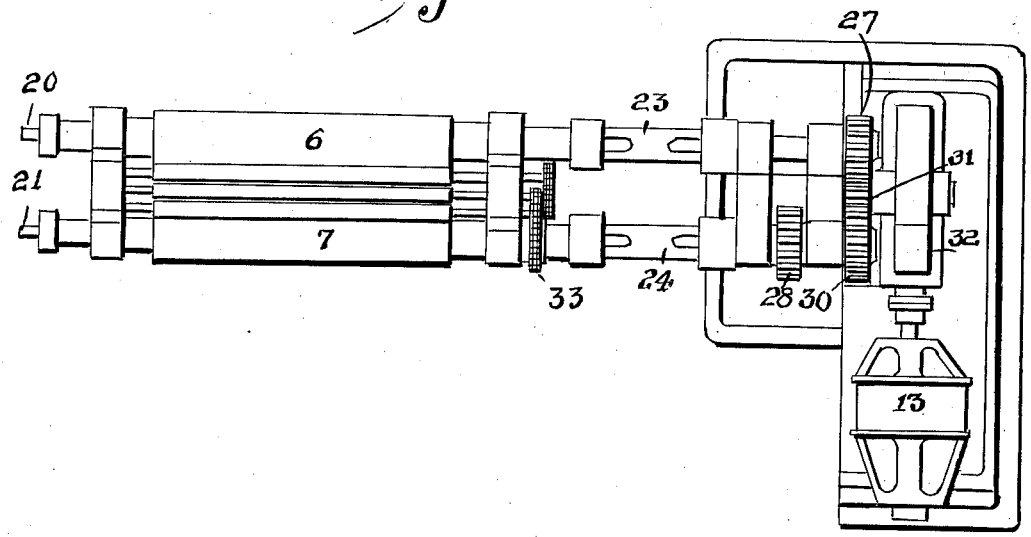
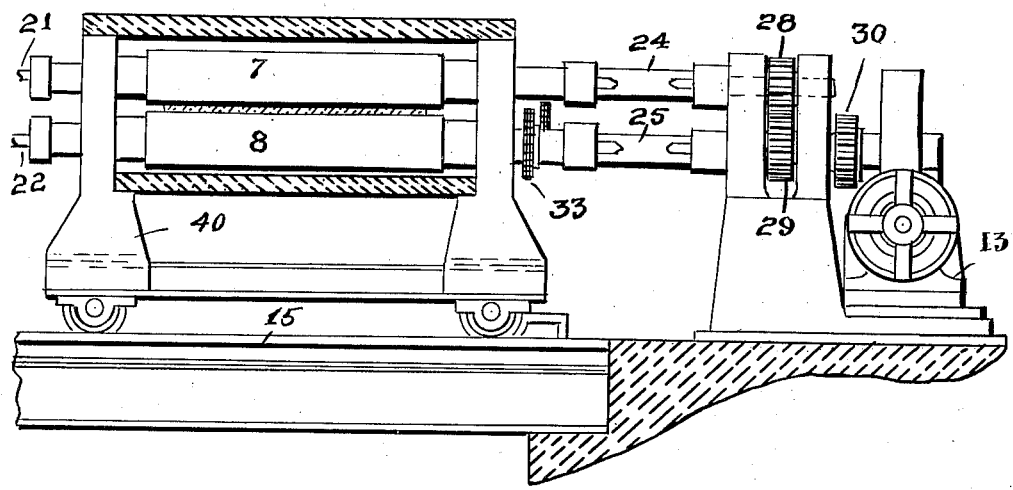
INVENTOR.  
Frederick Gelstharp  
BY James C. Bradley  
ATTORNEY Patented Sept. 7, 1926.

1,598,770

UNITED STATES PATENT OFFICE.

FREDERICK GELSTHARP, OF TARENTUM, PENNSYLVANIA, ASSIGNOR TO PITTSBURGH PLATE GLASS COMPANY, A CORPORATION OF PENNSYLVANIA.

APPARATUS FOR MAKING SHEET GLASS.

Application filed May 7, 1923. Serial No. 637,127.

The invention relates to the manufacture of sheet or plate glass, and has for its objects the provision of an improved apparatus for producing glass in a continuous sheet or ribbon from a tank, preferably from a melting tank of the regenerative type. One embodiment of the invention is illustrated in the accompanying drawings wherein:

Figure 1 is a vertical section through the apparatus. Fig. 2 is a plan view of the rolls and the driving connections therefor. And Fig. 3 is a front elevation of the apparatus of Fig. 2.

Referring to the drawings, the principal parts are as follows: 1 is the outlet end of a melting tank containing a bath of molten glass 2 and a cut-off gate 3; 4 is the side wall of the tank provided with the outlet slot 5; 6 is a feed roll for withdrawing the glass from the tank; 7 and 8 are sizing rolls for giving the glass sheet or ribbon a definite and uniform thickness; 9, 10 and 11 are supporting rolls intermediate the feed roll and the sizing rolls; 12 is the rear end of a leer into which the glass sheet or ribbon is conducted and 13 is the motor for driving the rolls.

The rolls 6, 7 and 8 are preferably mounted upon the truck 14 carried by the rails 15, while the leer 12 is mounted upon a framework 16 provided with wheels carried by the track 17, which arrangement provides for the necessary movement in case replacement or repair of the parts carried by the trucks is required and in order to give the necessary clearance for removing and replacing the outlet member 4 which constitutes the side wall of the tank. This outlet member is preferably supported in a framework made up of the commercial sections 18 and 19 and supported from above in such manner that it can be moved to and from position by means of an overhead crane.

The rolls 6, 7 and 8 are all hollow and preferably water cooled, this being accomplished by means of the connections 20, 21 and 22 shown in Figs. 2 and 3. At their other ends the rolls are provided with tumbler shafts 23, 24 and 25 carrying the gears 27, 28, 29 and 30. The gears 27 and 30, which are mounted respectively on the shafts 23 and 25, are driven from a gear 31 and this gear 31 is driven from the motor 13 through the intermediary of suitable reducing gearing in the casing 32. The shaft 24 which is connected to the roll 7 is driven from the shaft 25 by means of the spur gears 29 and 28 as indicated in Fig. 3. The shaft of the roll 8 is provided with a sprocket wheel 33 carrying a chain 34 which passes around a suitable sprocket on the shaft of the roll 11. The shaft of this roll 11 and also the shafts of the rolls 9 and 10 are provided with other sprocket wheels around which passes the chain 35 so that the rolls 9 and 10 are driven by the rotation of the roll 11. The gear 27 is of larger diameter than the gear 30 (Fig. 1), so that the roll 6 is driven at a slower rate than the rolls 7 and 8. The relative speed will depend on varying conditions and it may be desirable to drive the roll 6 independent of the rolls 7 and 8 in order to give the desired relative speed.

The leer 12 is preferably of the type illustrated being provided with a damper 36 at its rear end and having a series of rolls 37 for carrying the glass sheet or ribbon 38 through the leer, any suitable driving means for rotating the rolls being employed. Shade bars 39 and 40 of refractory material are provided above and below the rolls 6, 7 and 8. Additional heat is provided when necessary by means of the burners 42, 43, 44 and 45, such burners being particularly desirable at the edges of the sheet or ribbon which are liable to cool more rapidly than the central portion.

In operation the feed of glass is regulated by the rotation of the roll 6 which carries the glass from the outlet 5 up over the roll and delivers it to the sizing rolls 7 and 8. The glass reaches the rolls 7 and 8 at such a temperature and with a degree of plasticity such that it is readily sized to a definite and uniform thickness after which it passes through the leer and is annealed. The amount of glass which is fed to the rolls 7 and 8 is regulated by the speed of rotation of the rolls 6 and this roll 6 may also be varied in elevation to a greater or less degree depending upon conditions. It may be lowered so that its upper edge is only at the surface of the glass in the tank or slightly above it, although in practice it is preferred to have the upper edge at a substantial distance above the surface of the glass as illustrated. When not rotating the feed roll acts as a dam or gate, at which time it may be rotated forwardly at a very slow rate or turned backwardly in order to prevent the side next to the tank from becoming overheated.

What I claim is:

1. In apparatus for making sheet glass, the combination with a tank or receptacle for molten glass provided with an outlet through one of its side walls at the level of the body of glass in the tank, of a feed roll lying across the outlet and lying partly above and partly below the level of the glass in the tank, means for rotating the roll to feed the glass from the outlet and up over such roll in continuous sheet or ribbon, rolling means in advance of said roll for engaging the glass sheet while still plastic and reducing it to uniform thickness, and a leer in advance of said rolling means for annealing the glass sheet.

2. In apparatus for making sheet glass, the combination with a tank or receptacle for molten glass provided with an outlet through one of its side walls at the level of the body of glass in the tank, of a feed roll lying across the outlet and lying partly above and partly below the level of the glass in the tank, means for rotating the roll to feed the glass from the outlet and up over such roll in a continuous sheet or ribbon, and sizing means in advance of the feed roll for receiving the sheet or ribbon while still plastic and giving it a definite thickness.

3. In apparatus for making sheet glass, the combination with a tank or receptacle for molten glass provided with an outlet through one of its side walls at the level of the body of glass in the tank, of a feed roll lying across the outlet and lying partly above and partly below the level of the glass in the tank, means for rotating the roll to feed the glass from the outlet and up over such roll in a continuous sheet or ribbon, a pair of sizing rolls in advance of the feed roll for receiving the sheet or ribbon and giving it a definite thickness, and means whereby the sheet or ribbon is maintained in a plastic condition until it arrives at said sizing rolls.

4. In apparatus for making sheet glass, the combination with a tank or receptacle for molten glass provided with an outlet through one of its side walls at the level of the body of glass in the tank, of a single feed roll lying across the outlet at a level such as to cut off the flow of glass therefrom when not rotated to feed the glass a pair of sizing rolls in advance of said feed roll with the pass thereof below the level of the top of said feed roll, and means for rotating the roll to feed the glass from the outlet and to the sizing rolls in a continuous ribbon or sheet.

5. In apparatus for making sheet glass, the combination with a tank or receptacle for molten glass provided with an outlet through one of its side walls at the level of the body of glass in the tank, of a feed roll lying across the outlet and lying partly above and partly below the level of the glass in the tank, means for rotating the roll to feed the glass from the outlet and up over such roll in a continuous sheet or ribbon, a pair of sizing rolls in advance of the feed roll with the pass thereof below the top of the feed roll for receiving the sheet or ribbon and giving it a definite thickness, and means for heating the sheet or ribbon intermediate the feed roll and the sizing rolls to keep it in plastic condition.

In testimony whereof, I have hereunto subscribed my name this 2nd day of May, 1923.

FREDERICK GELSTHARP.